US006354543B1

United States Patent
Paske

(10) Patent No.: US 6,354,543 B1
(45) Date of Patent: Mar. 12, 2002

(54) STACKABLE TRANSMISSION LINE HANGER

(75) Inventor: Jamie M. Paske, Oak Lawn, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/430,496

(22) Filed: Oct. 29, 1999

Related U.S. Application Data

(63) Continuation-in-part of application No. 09/229,843, filed on Jan. 12, 1999, now Pat. No. 6,161,804.

(51) Int. Cl.[7] .................................................. F16L 3/22
(52) U.S. Cl. ...................... 248/68.1; 248/74.2; 248/71; 211/85.18
(58) Field of Search ............................ 248/74.2, 231.8, 248/71, 73, 74.3, 68.1, 74.1; 24/174 D, 16 PB; 343/890, 891, 892, 874; 138/106, 107, 111

(56) References Cited

U.S. PATENT DOCUMENTS

| 333,119 A | * 12/1885 | Ephraim ..................... 138/111 |
| 2,397,680 A | 4/1946 | Morehouse |
| 2,577,120 A | * 12/1951 | Franz ..................... 211/85.18 |
| 2,682,385 A | 6/1954 | Schluter |
| 2,716,703 A | 8/1955 | Kane |

(List continued on next page.)

FOREIGN PATENT DOCUMENTS

| CA | 1000677 | 11/1976 |
| DE | 710034 | 9/1941 |
| DE | 6912883 | 3/1969 |
| DE | 2807119 | 8/1979 |
| DK | 168 882 | 10/1959 |
| GB | 1062633 | 3/1967 |

OTHER PUBLICATIONS

Article;"Unviersal Snap–In Hangers for Wireless Applications," *ICESCo™ Accessories*, 1 pg., date unknown.

*Primary Examiner*—Anita King
*Assistant Examiner*—Gwendolyn Baxter

(57) ABSTRACT

In one aspect, a stackable transmission line hanger is provided for securing one or more transmission lines to a supporting structure. Each such hanger includes a transmission line retention section for accommodating a transmission line and a mounting section extending from the transmission line retention section, the mounting section including a mounting hole disposed therein. The transmission line retention section includes a first leg and a second leg extending therefrom, the first and second legs allowing the hanger to accommodate various sizes of transmission lines. The first and second legs each include a locking barb configured to lock against an attachment surface.

38 Claims, 12 Drawing Sheets

U.S. PATENT DOCUMENTS

| | | |
|---|---|---|
| 2,941,768 A | 6/1960 | Elms et al. |
| 3,131,447 A | 5/1964 | Tinnerman |
| 3,154,281 A | 10/1964 | Frank |
| 3,237,905 A | 3/1966 | Baker et al. |
| 3,336,543 A | 8/1967 | Johnson et al. |
| 3,345,706 A | 10/1967 | Stokes |
| 3,346,863 A | 10/1967 | Siebold |
| 3,444,596 A | 5/1969 | Soltysik |
| 3,501,117 A | 3/1970 | Soltysik |
| 3,822,411 A | 7/1974 | Merle |
| 4,023,596 A * | 5/1977 | Tate .......................... 138/111 |
| 4,047,133 A | 9/1977 | Merle |
| 4,194,380 A | 3/1980 | Brown et al. |
| 4,286,654 A * | 9/1981 | Ruhe et al. ................. 165/172 |
| 4,306,697 A * | 12/1981 | Mathews ..................... 248/68 |
| 4,325,526 A * | 4/1982 | Kitagawa ..................... 248/73 |
| 4,334,659 A | 6/1982 | Yuda |
| 4,505,006 A | 3/1985 | Andre |
| 4,540,959 A | 9/1985 | Saad |
| 4,572,466 A | 2/1986 | Yamaguchi et al. |
| 4,642,585 A | 2/1987 | Saad |
| 4,654,612 A | 3/1987 | Smith |
| 4,763,132 A | 8/1988 | Juds et al. |
| 4,813,639 A | 3/1989 | Midkiff et al. |
| 4,958,792 A | 9/1990 | Rinderer |
| 5,108,055 A * | 4/1992 | Kreinberg et al. ............ 248/71 |
| 5,167,533 A | 12/1992 | Rauwolf |
| 5,201,484 A * | 4/1993 | Thoen ....................... 248/68.1 |
| 5,334,051 A | 8/1994 | Devine et al. |
| 5,393,021 A | 2/1995 | Nelson |
| 6,161,804 A * | 12/2000 | Paske et al. ............... 248/74.1 |

* cited by examiner

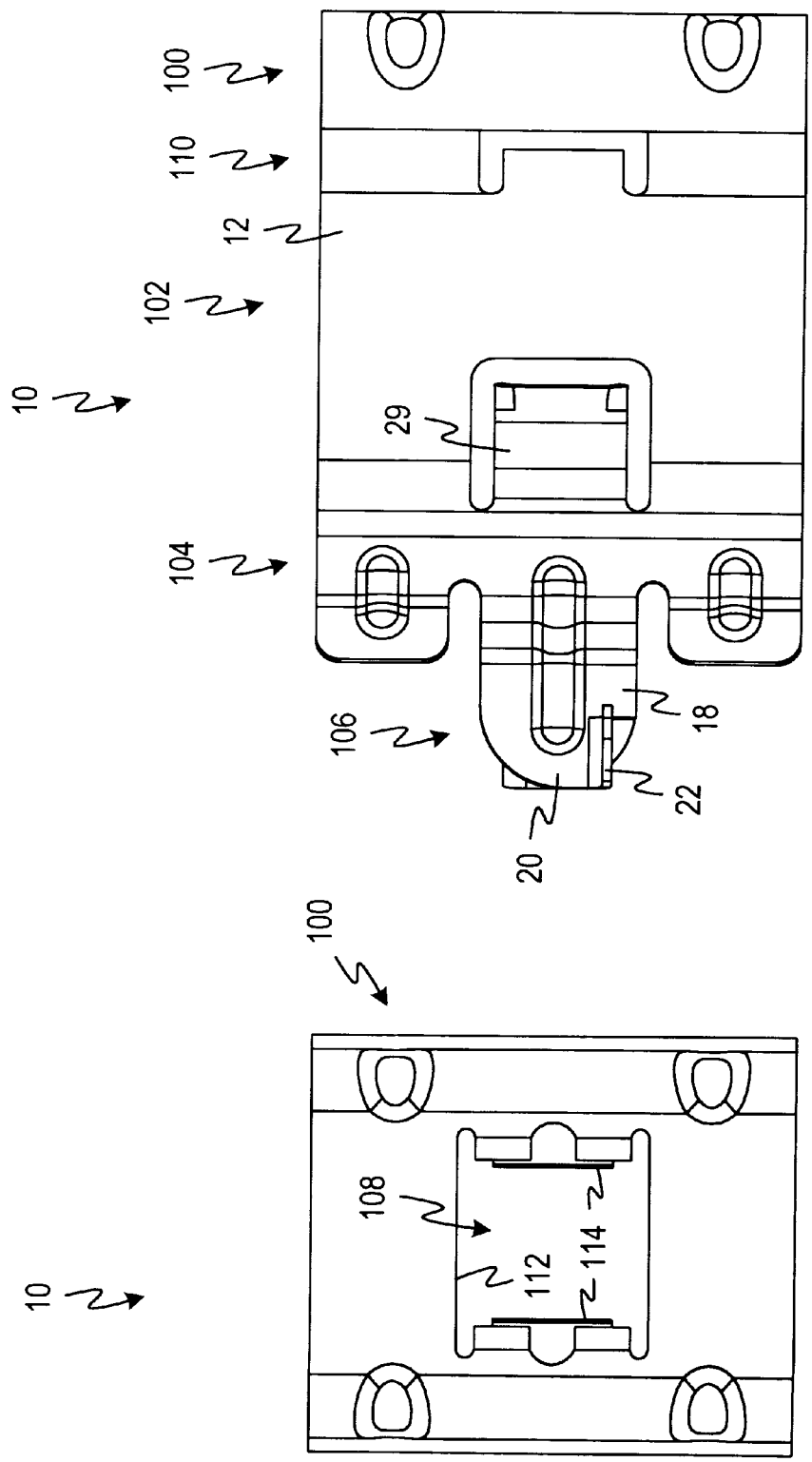

STACKABLE TRANSMISSION LINE HANGER

CROSS-REFERENCE TO RELATED APPLICATION

This application is a continuation-in-part of patent application Ser. No. 09/229,843, filed Jan. 12, 1993 now U.S. Pat. No. 6,161,804.

FIELD OF THE INVENTION

This invention relates generally to transmission lines, and in particular to stackable transmission line hangers for supporting one or more transmission lines for an antenna system.

BACKGROUND OF THE INVENTION

Transmission line hangers are used to support transmission lines. Generally, a transmission line is inserting into a transmission line hanger which is then attached to a supporting structure. The most extensive use of hangers is in connection with coaxial cables, such as those disclosed in U.S. Pat. Nos. 5,334,051 to Devine, et al. and 5,167,533 to Rauwolf. Coaxial cables are extensively used for carrying a variety of electromagnetic signals. In most uses, the cables need to be attached to a supporting structure along most of their lengths.

Transmission line hangers are also used for supporting waveguides which carry electromagnetic signals from transmitting or receiving equipment in an equipment shelter to an antenna mounted on a tall tower. A large number of hangers are required to support a waveguide beneath a horizontal waveguide bridge extending between the shelter and the base of the tower and to support the waveguide on the tower as the waveguide extends upwardly to the antenna. An even larger number of hangers are required where separate waveguides extend to several antennas on a signal tower. Commercially available waveguides have a variety of cross-sectional shapes. For example, a variety of waveguide shapes are disclosed in U.S. Pat. Nos. 3,822,411 to Merle and 4,047,133 to Merle.

Typically, transmission line hangers are attached to a supporting structure such as a transmission line bridge or an antenna tower by inserting a bolt through a U-shaped hanger and through a hole in the supporting structure. The bolt is held in place by a nut and lock washer. After the hangers have been attached to the supporting structure, the transmission line is strung along the bridge, up the tower and clamped between the legs of each U-shaped hanger by tightening a clamping screw which extends between the legs. A considerable amount of installation time is required, first to attach the large number of hangers to the bridge and the tower and then to clamp the transmission line within the hangers. In addition, a large amount of auxiliary hardware (e.g., screws, bolts, nuts and washers) is required along with the hangers themselves.

A spring hanger system for supporting a VHF circular waveguide is disclosed in U.S. Pat. No. 4,654,612 to Smith. A variety of prior hangers for microwave transmission lines are disclosed in Andrew Corporation Catalog #36. An improved waveguide hanger is disclosed in U.S. Pat. No. 4,763,132 to Juds, et al. The waveguide hanger disclosed in the Juds, et al. patent is in the form of a resiliently yieldable and generally U-shaped clip that is adapted to be slipped over an elliptical waveguide and snapped into a supporting structure. The clip includes a hinge portion that extends between the legs of the clip.

Another cable hanger is disclosed in U.S. Pat. No. 5,393,021 to Nelson. The cable hanger disclosed therein includes a hinge section, a cable retention section, and a structure attachment section having two locking members that each include a pair of concave locking barbs. Cable hangers that include a hinge section can only accommodate a limited range of cable diameters. The maximum cable diameter accepted by such cable hangers is limited by the maximum circumference of the cable retention section.

Prior transmission line hangers, such as those disclosed in Nelson and Juds, et al., also place the cable retention section close to the attachment section. Thus, the attachment section is traditionally short in length. This makes the attachment section rigid and non-compliant which makes installation of such hangers difficult especially where a large diameter cable is being installed on a tower or where the weather conditions limit manual dexterity, e.g., cold weather. In such situations, tools may be required to squeeze the hanger into the tower aperture. The use of tools is undesirable especially where a transmission line is being installed on a tall tower.

Furthermore, some prior hanger designs do not adequately prevent longitudinal movement of the cable with respect to the hangers. Hangers without mechanisms for penetrating or biting into the cable jacket can not prevent longitudinal movement of the cable because the frictional coefficient between the metal hanger and the plastic cable jacket is very low. The polyethylene typically used for cable jackets is a soft material that has an inherent lubricant quality. In addition, the cable jacket can "cold flow" which reduces the holding force of the cable hanger over time, resulting in cable slippage.

Moreover, due to the increasing number of antennas being installed on antenna towers, multiple transmission lines must be strung along the tower to connect to those antennas. Therefore, hangers capable of supporting a plurality of parallel transmission lines were developed. One such example is U.S. Pat. No. 5,794,897 to Jobin, et al. This patent shows a two piece transmission line hanger that is stackable to accommodate a plurality of parallel transmission lines.

However, one drawback of current stackable hanger designs is that a considerable amount of installation time is required to attach the two hanger halves around the transmission line(s) and the hanger assembly to the supporting structure. In addition, auxiliary hardware (e.g., screws, bolts, nuts and washers) is required to secure the hangers to the supporting structure. Moreover, when subsequent transmission lines must be added to accommodate one or more new antennas, the existing two piece stackable hanger assembly has to be unassembled to add another hanger thereto. For instance, the bolt of the first hanger has to be removed, the two hanger halves of another hanger must be placed around the new transmission line(s) and the four hanger halves must be assembled together by inserting a bolt through the hangers and through a hole in the supporting structure and fastening a lock washer and a nut to the bolt. Therefore, there is a need for a novel stackable transmission line hanger that is easy to install, easy to add addition transmission lines thereto and inexpensive to manufacture.

The installation of one or more transmission lines along a supporting structure is often a difficult and time-consuming operation because of the large amount of auxiliary hardware required to install some prior hangers and/or the necessity to remove an assembled hanger to add an addition transmission line. Therefore, there is a continuing need for easy to install stackable hangers and for improved methods of installing them. The present invention addresses these needs by providing a one piece, stackable transmission line hanger capable of securing one or more transmission lines. The stackable hanger is expandable to accommodate addition transmission lines without unassembling the prior hanger(s), is expandable to accommodate a large number of transmission line diameters, is inexpensive to produce, and is quickly and easily installed. In addition, the stackable hanger reduces the number of components required to secure one or more transmission lines, reduces installation time, reduces longitudinal movement of the transmission line within each hanger, and allows for simple installation of additional transmission lines.

SUMMARY OF THE INVENTION

In one aspect, a stackable transmission line hanger is provided for securing one or more transmission lines to a supporting structure. Each such hanger includes a transmission line retention section for accommodating a transmission line and a mounting section extending from the transmission line retention section. The mounting section includes a mounting hole disposed therein. The transmission line retention section includes a first leg and a second leg extending therefrom. The first and second legs allow the hanger to accommodate various sizes of transmission lines. The first and second legs each include a locking barb configured to lock against an attachment surface.

BRIEF DESCRIPTION OF THE DRAWINGS

FIG. 3 is a side view of the transmission line hanger of FIG. 1;

FIG. 4 is a top view of the transmission line hanger of FIG. 1;

FIG. 10b is a view of the transmission line hanger of FIG. 10a;

FIG. 11b is a side view of the transmission line hanger of FIG. 11a.

DESCRIPTION OF ILLUSTRATIVE EMBODIMENTS

It has been discovered that multiple transmission lines can be efficiently and inexpensively supported by using a one piece, stackable transmission line hanger 10 according to one embodiment of the present invention. A one piece or unitary hanger is less expensive to produce and more reliable than hangers composed of several pieces. However, a stackable hanger having two or more pieces that are, for example, welded together, would function the same as the unitary hanger described herein.

One or more of the transmission line hangers 10 can be used to support one or more transmission lines, including circular coaxial cables and waveguides, in generally parallel rows. The hanger 10 can accommodate a large range of different transmission line diameters. One row of transmission line hangers 10 generally secures one transmission line to a supporting structure, such as a horizontal transmission line bridge or a vertical antenna tower. One or more additional rows of hangers 10 can secure one or more additional transmission lines by attaching to the respective transmission line hangers in the first row. The transmission line hangers 10 are easy to install because no ancillary hardware is required such as nuts, bolts or screws.

Figure 1:
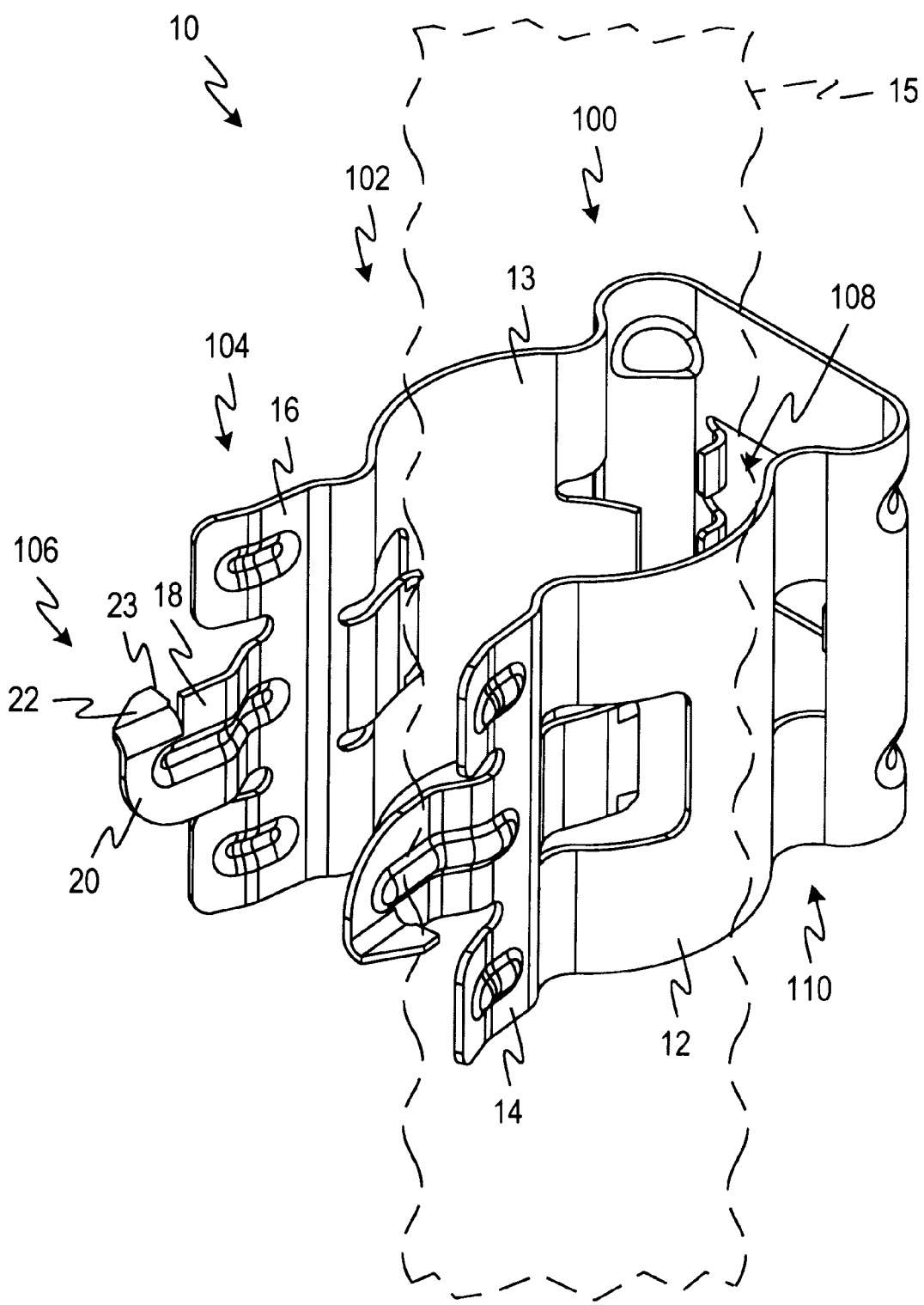
FIG. 1 is a perspective view of a transmission line hanger according to one embodiment of the present invention.

The present invention will now be described in connection with the embodiments shown in the drawings. Referring first to FIG. 1, the transmission line hanger 10 is illustrated. In the illustrated embodiment, the hanger 10 is a unitary structure essentially composed of metal. In one embodiment, the hanger 10 is composed of stainless steel having a thickness of 0.76 mm. The illustrated hanger 10 includes a mounting section 100, a transmission line retention section 102, an extended section 104 and an attachment section 106. The mounting section 100 extends from the transmission line retention section 102. The mounting section 100 includes a mounting hole 108 disposed therein, as shown in FIGS. 1 and 4. The transmission line retention section 102 includes two opposing curved members 12 and 13 that accommodate a transmission line 15 which is shown in dotted lining in FIG. 1. The curved members 12, 13 include a first leg 14 and a second leg 16, respectively, that comprise the extended section 104. The first and second legs 14, 16 extend from the respective curved members 12, 13. A compliant area 110 is disposed between the mounting section 100 and the retention section 102 and allows the first and second legs 14, 16 to be pressed toward each other and to expand away from each other by spring force.

Figure 2:
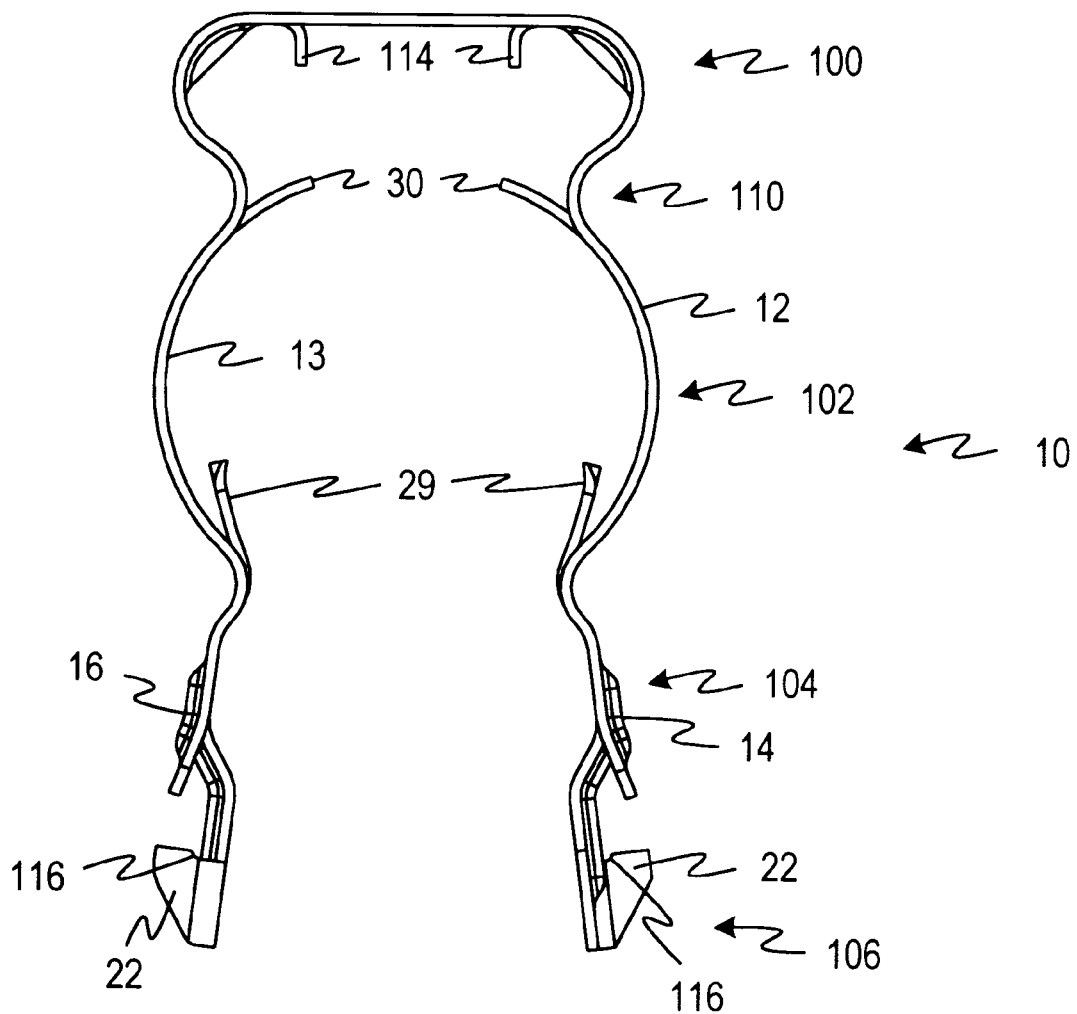
FIG. 2 is a front view of the transmission line hanger of FIG. 1.

In one embodiment, the extended section 104 includes a pair of spring fingers 29 projecting inwardly from the extended section 104 and into the transmission line retention section 102, as illustrated in FIG. 2. The first leg 14 includes one of the pair of spring fingers 29 flexibly connected thereto and projecting inwardly therefrom. The second leg 16 includes a second of the pair of spring fingers 29 flexibly connected thereto and projecting inwardly therefrom. The spring fingers 29 are flexibly connected to the respective legs 14, 16 such that when a transmission line is inserted into the hanger 10 the spring fingers 29 flex outward with respect to the respective legs 14, 16, and force the transmission line against a pair of opposing transmission line stops 30. Thus, the spring fingers 29 provide spring resistance against the transmission line after it is inserted in the hanger 10. The spring fingers 29 also penetrate or bite into the jacket of the transmission line to further secure the transmission line within the hanger 10. The spring fingers 29 and the stops 30 help minimize the longitudinal movement of the transmission line in the hanger 10 even on smooth (non-corrugated) transmission lines. Longitudinal movement is defined as movement in a direction parallel to the length of the transmission line.

The stackable, snap-in hanger 10 requires no additional hardware to install it to an attachment surface. In contrast, prior hanger assemblies required hardware such as lock washers and nuts to secure a transmission line to a supporting structure. These parts tended to loosen over time with vibration caused by, e.g., wind gusts. Thus, the hanger 10 includes the spring fingers 29 which help to minimize transmission line vibration. In addition, the hanger 10 insures that an improper amount of torque is not applied to a hanger assembly because there is no additional hardware required to fasten the hanger 10 to an attachment surface.

Figure 5:
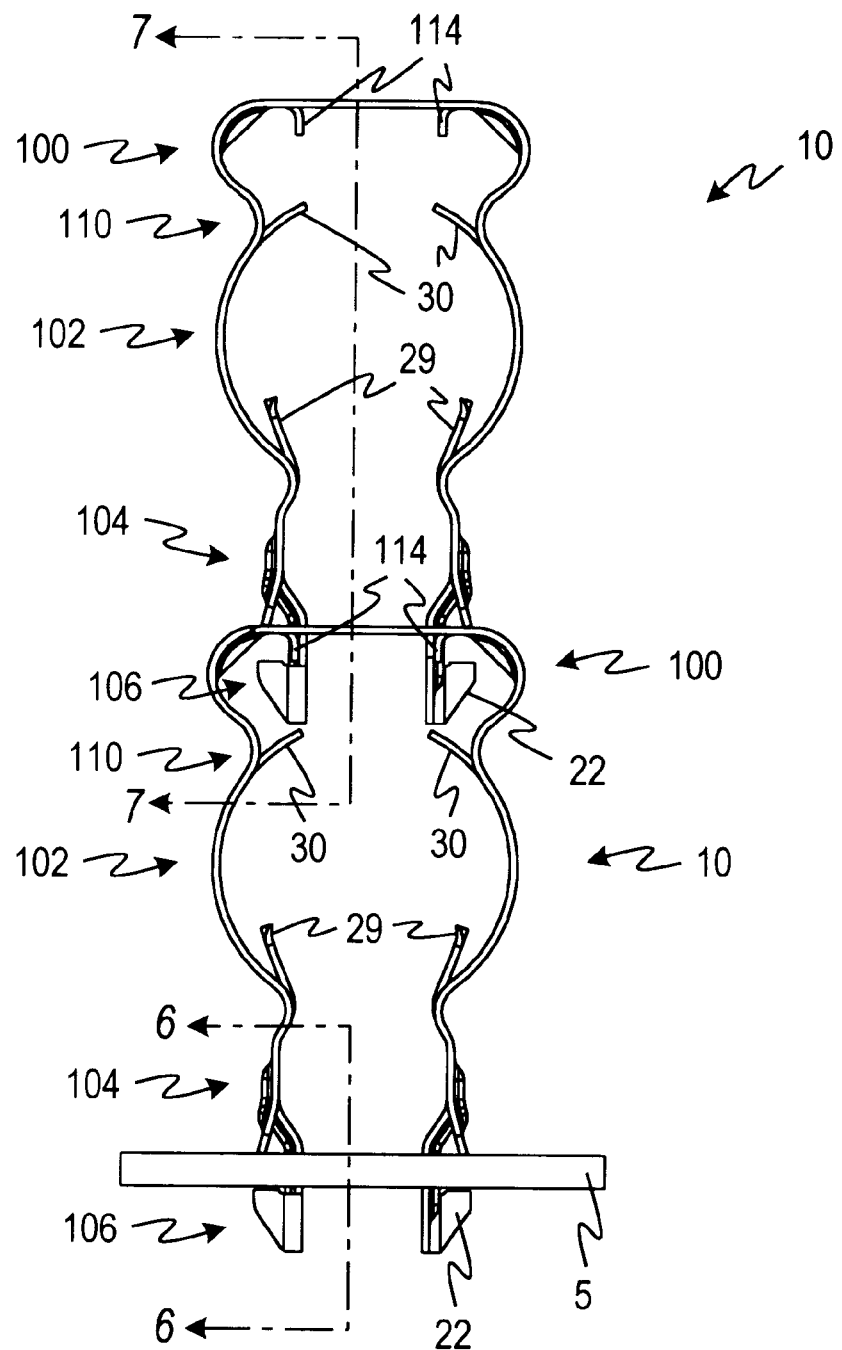
FIG. 5 is a front view of two of the transmission line hanger shown in FIG. 1 stacked together.

The compliant area 110, in conjunction with the spring fingers 29, allow the hanger 10 to have the compliance necessary to accommodate a large range of different transmission line diameters. The extended section 104 has the compliance to allow the hanger 10 to accommodate a large range of transmission line diameters and still allow the attachment section 106 to be inserted into an aperture in an attachment surface such as a supporting structure 5 or the mounting hole 108 of another hanger 10, as shown in FIG. 5. Prior hangers without an extended section between the transmission line retention section and the attachment section had essentially no compliance. Thus, in these prior designs, if a transmission line larger than the diameter that the transmission line retention section could accommodate was inserted into the hanger, then the attachment section would not be able to be squeezed to allow the attachment section to be inserted into an aperture in, e.g., a supporting structure.

Moreover, the extended section 104, in conjunction with the pair of spring fingers 29, allows the hanger 10 to accommodate a large range of different transmission line diameters by having the compliance to expand for larger transmission lines. The extended section 104 and the spring fingers 29 also have the compliance to allow the hanger 10 to accommodate a large range of transmission line diameters while still allowing the attachment section 106 to be inserted into an attachment surface.

Unlike prior hangers, the shape of the retention section 102 and the attachment section 106 of the hanger 10 do not change significantly in response to supporting different diameter transmission lines. The pliability of the spring fingers 29 allows the spring fingers 29 to flex inward with respect to the extended section 104 after a transmission line has been inserted into the retention section 102. The pliability of the extended section 104 allows the attachment section 106 to be inserted into an aperture in an attachment surface without significantly changing the shape of the transmission line retention section 102 despite different diameter transmission lines being supported by the hanger 10.

Returning to FIG. 1, the attachment section 106 includes a first section 18 that extends from each of the first and second legs 14, 16, respectively. A second section 20 extends from the first section 18 and forms a locking barb 22 that is configured to lock against an attachment surface once the locking barb is inserted through an aperture in the attachment surface. The locking barb 22 is integral with the second section 20 and extends from and is generally orthogonal thereto. Each locking barb includes a barb contact point 23 for contacting the attachment surface.

Figure 6:
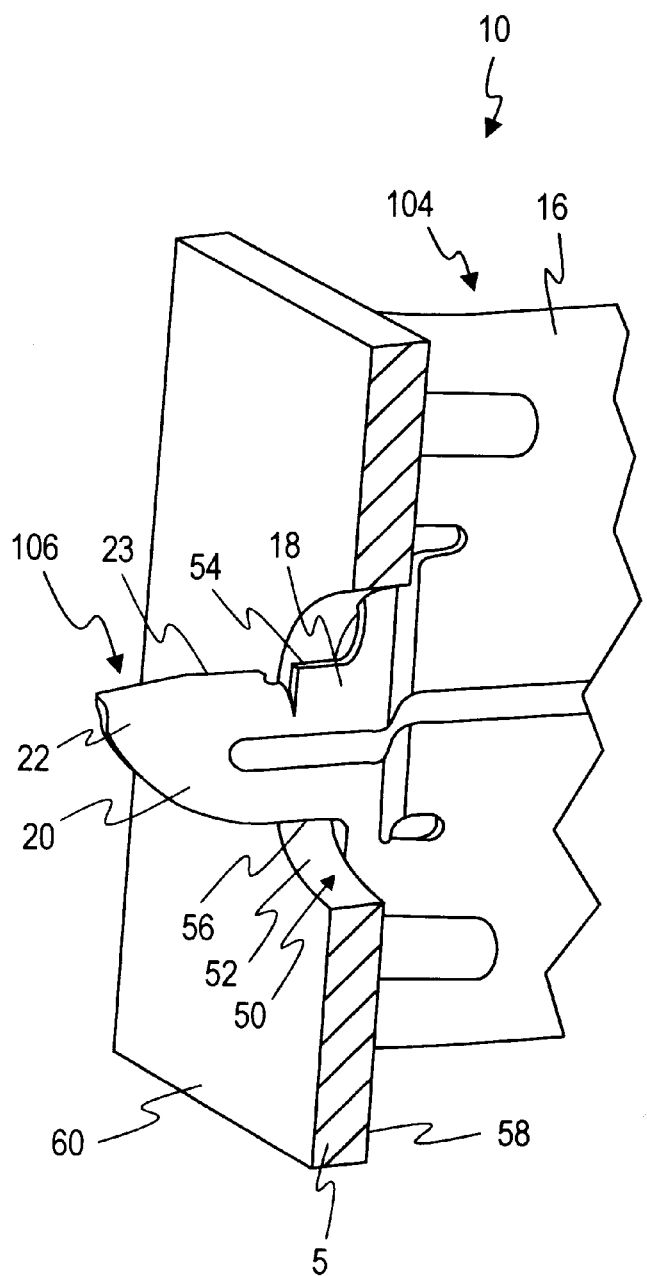
FIG. 6 is a partial cross-sectional perspective view taken along line 6—6 in FIG. 5.

FIG. 6 shows how the attachment section 106 is secured to the supporting structure 5 which can include, for example, a horizontal transmission line bridge or a vertical antenna tower. The supporting structure 5 includes a circular aperture 50 defined by a wall 52. The first section 18 contacts the wall 52 at one or both of a pair of contact points 54 and 56. The locking barb 22 is configured to lock against the supporting structure 5 once the locking barb is inserted through the aperture 50. The supporting structure 5 includes an outer surface 58 and an inner surface 60. The surfaces of the supporting structure may be rough due to, for example, irregularities, bubbles and/or barbs caused by the galvanizing process and/or the punching process that produces the aperture 50. Therefore, the hanger 10 is designed such that each locking barb 22 contacts the inner surface 60 of the supporting structure 5 at the barb contact point 23. Because the hanger 10 includes two locking barbs 22, one on each leg 14, 16, the hanger 10 can be more securely attached to the supporting structure 5 despite any irregularities on the inner surface 60.

The wall 52 of the aperture 50 may also be rough because of irregularities, bubbles and/or barbs caused by the galvanizing process and/or the punching process that produces the aperture 50. Therefore, in one embodiment, contact with these irregularities is minimized by having the first section 18 of the hanger 10 only contact the wall 52 at one or both of the pair of contact points 54 and 56, instead of, e.g, a curved surface contacting a large portion of the wall 52.

Figure 7:
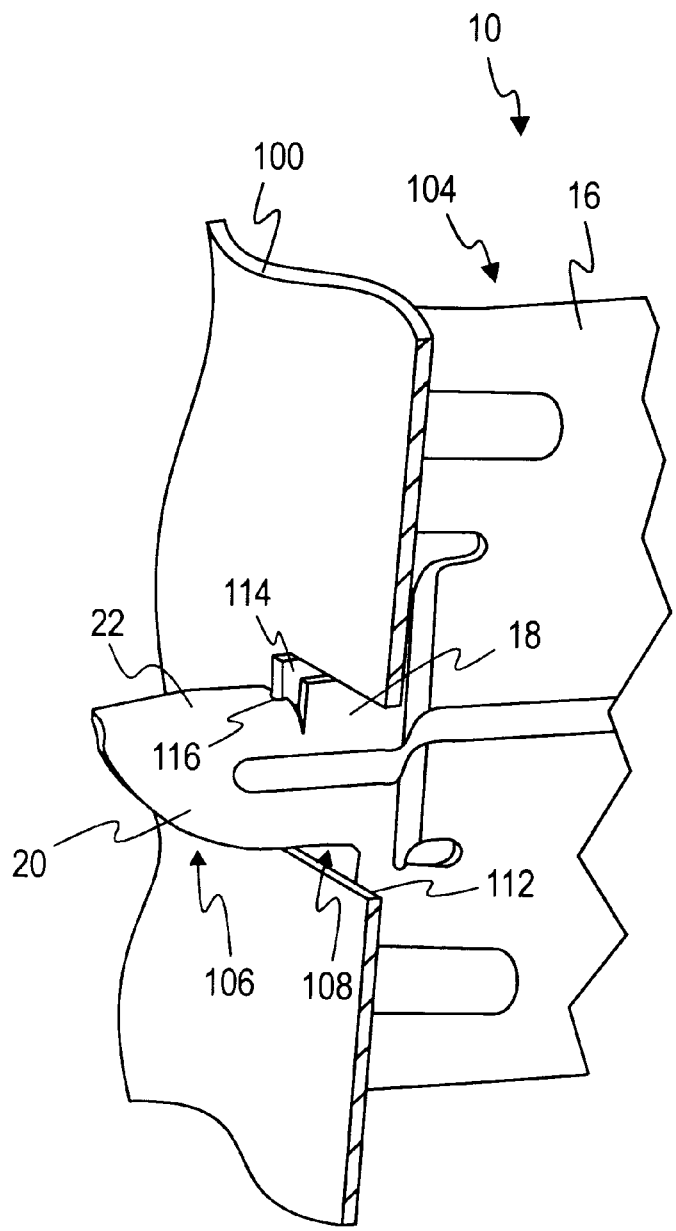
FIG. 7 is a partial cross-sectional perspective view taken along line 7—7 in FIG. 5.
Figure 8:
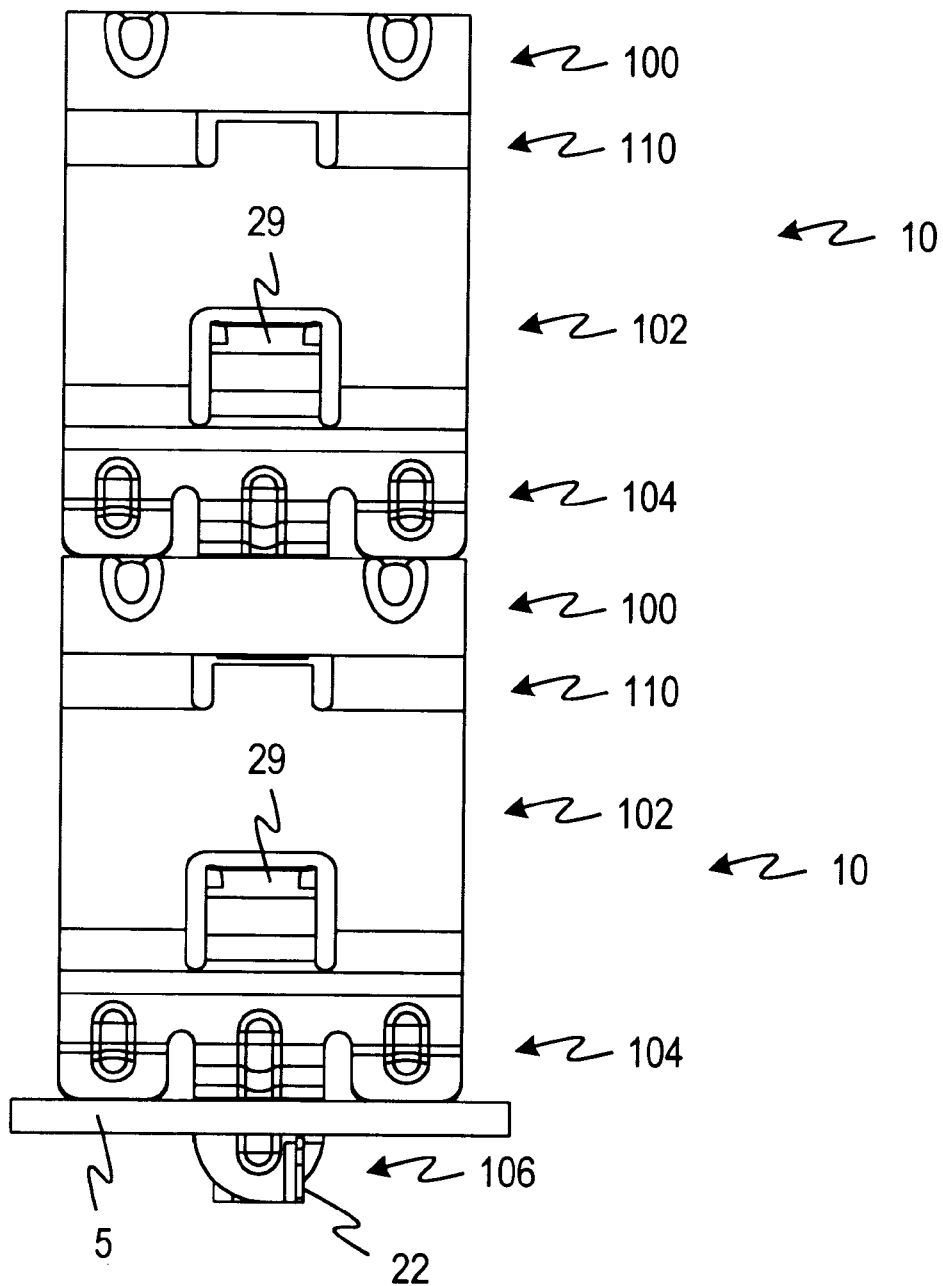
FIG. 8 is a side view of the stacked transmission line hangers of FIG. 5.

FIG. 7 shows how the attachment section 106 is secured to the mounting section 100 of another hanger 10. The mounting section 100 includes a square mounting hole 108 disposed therein. The locking barb 22 is configured to lock against the mounting section 100 once the locking barb 22 is inserted through the mounting hole 108. The square mounting hole 108 is defined by a wall 112 having a pair of opposing lips 114, as shown in FIGS. 2, 4 and 7. The square mounting hole 108 provides an anti-rotation feature that keeps the hangers 10 aligned. Specifically, the locking barb 22 includes a notch 116 that is configured to lock against the lip 114 of another hanger 10 once the locking barb 22 is inserted through the mounting hole 108 and the first and second legs 14, 16 are released. The notch 116 insures that the second row hanger 10 is aligned with the first row hanger 10. The aligned hangers 10 insure that the transmission lines secured therein are generally parallel to each other. The notch 116 in each locking barb 22 insures a secure connection between each additional hanger 10. The notches 116 lock the distal end of both legs 14, 16 against the opposing lips 114 of the mounting section 100 of another hanger 10, as shown in FIG. 7.

Moreover, adding an additional row of hangers 10 to a prior row of hangers 10 produces a "chaining effect". The resulting assembly of hangers 10 is not rigid; rather, the assembly is able to flex between the hanger pairs. Therefore, the problems of side loading produced by a rigid hanger assembly attached to an antenna tower are reduced. For example, a rigid assembly acts as a lever arm which reduces the force required to pull the rigid hanger assembly from its supporting structure. However, with the chaining effect produced by the hangers 10, the side loading is distributed through the various attachment and mounting sections of the multiple hangers 10 rather than transferring the entire load back to the base hanger. Therefore, the load is shared by the hangers 10. The hangers 10 can thus act as a "spring" during a wind gust rather than as a rigid member. This "spring" effect makes the transmission lines secured by the hangers 10 less likely to be blown off the supporting structure 5.

As best shown in FIGS. 1 and 2, in one embodiment, the compliant area 110 is provided by a fulcrum or bend. The compliant area 110 enables the first and second legs 14, 16 to be pressed together thus allowing the locking barbs 22 to fit through an aperture in an attachment surface. The compliant area 110 also allows the first and second legs 14, 16 to expand by spring force once the locking barb 22 is inserted through the aperture. This expansion brings the first section 18 into contact with, e.g, the wall 52 of the aperture 50 at one or both of the pair of contact points 54 and 56, as is shown in FIG. 6. Alternatively, this expansion also brings the notch 116 into contact with the lip 114 of the mounting hole 108 of another hanger 10, as shown in FIG. 7.

The design of the hanger 10, and in particular the extended section 104, allows for easy installation of the hanger 10. Specifically, the extended section 104 allows larger diameter transmission lines to be inserted into the hanger 10. The user then wraps his or her fingers around the hanger 10, and the transmission line therein, and presses the legs 14, 16 together. The extended section 104 places the transmission line retention section 102 further away from the attachment surface, such as the supporting structure 5 or the mounting section 100. In addition, the attachment section 106 is closer to the user's fingers and thumb thus allowing a greater range of motion and greater force to be applied to the hanger 10 when inserting the attachment section 106 into an attachment surface. The extended section 104 also gives the user more room to work, and avoids the user's hands from hitting attachment surface during installation. The mounting section 100 further extends the distance the user's fingers and thumb are from the attachment surface.

The design of the hanger 10, and in particular the extended section 104, also provides a more dynamic snap-in action than prior hangers when the hanger 10 is installed into an attachment surface. The two locking barbs 22 also provide less insertion resistance than prior hanger designs having four locking barbs. Having only two locking barbs 22 reduces the number of contact points that must contact, for example, the outer surface 58 of the supporting structure 5 during insertion of the hanger 10 into the supporting structure 5. Additionally, the two barb design of the attachment section 106 reduces insertion resistance by reducing the cam pressure required and the amount of deflection required to insert the hanger 10 into an attachment surface. This reduces the amount of force required to insert the hanger 10 into, for example, a supporting structure or a mounting section of another hanger 10. The hanger 10 thus requires less manual dexterity to install and uninstall than prior hangers. In addition, the ergonomic design of the hanger 10, including the extended section 104, allows for easier installation. These are important features especially where the typical transmission line is in excess of 1,000 feet and a hanger is mounted every three feet. Consequently, hundreds of hangers must be installed to support such a transmission line. The hours required to install that many hangers is great. Accordingly, transmission line installation is costly. In addition, it can be difficult to find someone willing to install transmission line hangers high above the ground, especially if extra hardware is required to install the hangers. Therefore, a hanger that requires less installation time and is easier to install reduces the number of hours required for installation, thus reducing installation costs.

In another embodiment, the extended section 104 includes one spring finger 29 projecting inwardly from the extended section 104 and into the transmission line retention section 102. For example, the first leg 14 may include one spring finger 29 flexibly connected thereto and projecting inwardly therefrom. The one spring finger 29 is flexibly connected to the first leg 14 such that when a transmission line is inserted into the hanger 10 the spring finger 29 flexes outward with respect to the first leg 14 and forces the transmission line against the left transmission line stop 30.

Thus, the one spring finger 29 can provide spring resistance against the transmission line after it is inserted in the hanger 10. The one spring finger 29 also bites into the jacket of the transmission line to further secure the transmission line within the hanger 10. The one spring finger 29 and the stops 30 help minimize the longitudinal movement of the transmission line in the hanger 10 even on smooth (non-corrugated) transmission lines. The one spring finger 29 also helps minimize transmission line vibration. Alternatively, the second leg 16 may include one spring finger 29 flexibly connected thereto and projecting inwardly therefrom, that forces the transmission line against the right transmission line stop 30. In either case, the extended section 104, in conjunction with the one spring finger 29, allows the hanger 10 to accommodate a large range of different transmission line diameters by having the compliance to expand for larger transmission lines. The extended section 104 and the one spring finger 29 also have the compliance to allow the hanger 10 to accommodate a large range of transmission line diameters while still allowing the attachment section 106 to be inserted into an attachment surface.

In the illustrated embodiments, no matter how the transmission line is disposed in the hanger 10, the two opposing spring fingers 29 will provide spring resistance against the transmission line, which in turn will force the transmission line against the pair of opposing transmission line stops 30, and bite into the jacket of the transmission line.

Figure 9:
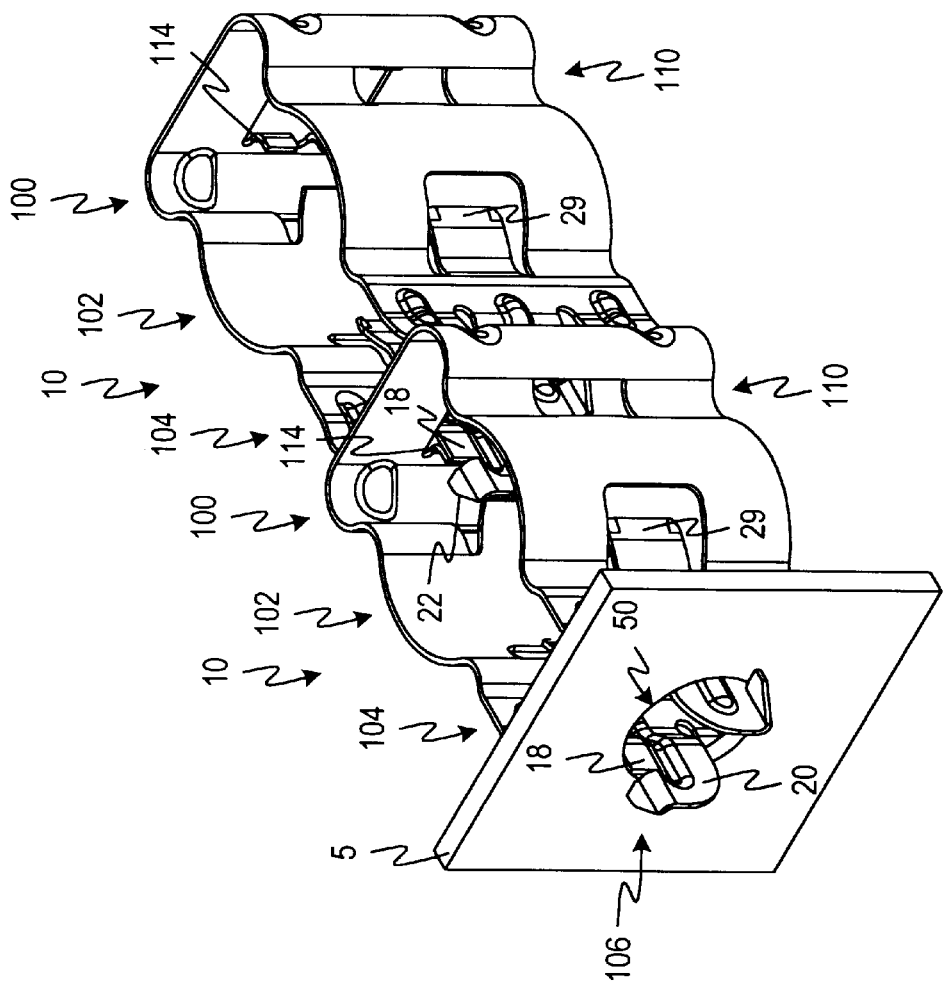
FIG. 9 is a perspective view of the stacked transmission line hangers of FIG. 5.

In use, the hanger 10 may be installed easily and quickly by pulling apart the legs 14, 16 and slipping the hanger 10 over the transmission line such that the curved members 12, 13 are disposed around the transmission line and the spring fingers 29 are forced against the transmission line thus pressing the transmission line against the opposing transmission line stops 30. The legs 14, 16 are then pressed together to allow the locking barbs 22 to be inserted through an aperture in an attachment surface, such as the supporting surface 5, as illustrated in FIG. 9. The hanger 10 is inserted into the aperture 50 until the first sections 18 snap into contact with the supporting structure 5 at one or both of the pair of contact points 54 and 56 and the barb contact point 23 contacts the inner surface 60 of the supporting structure 5, as illustrated in FIG. 6. This process is repeated for each hanger 10 that is installed into the supporting surface 5 along the length of the transmission line. Likewise, the legs 14, 16 are pressed together to allow the locking barbs 22 to be inserted through the mounting hole 108 in the mounting section 100 of another hanger 10, as illustrated in FIGS. 5 and 7. Then, the legs 14, 16 are released and the spring force provided by the compliant area 110 expands the legs 14, 16 until the notch 116 of each locking barb 22 locks against the lip 114, as best illustrated in FIG. 7. This process is repeated for each hanger 10 that is installed as an additional row onto a previously installed transmission line hanger(s) 10. Thus, each additional transmission line run that is added to, e.g., an antenna tower is independent of the previous transmission line run. In other words, each additional hanger 10 can be installed independent of, and without unassembling, the prior hanger(s) 10.

The hanger 10 can also be readily uninstalled and reused in another location. To uninstall the hanger 10, the legs 14, 16 are pressed together to allow the locking barbs 22 to be removed from the attachment surface. Next, the retention section 102 is slipped off the transmission line by pulling apart the legs 14, 16 and disengaging the spring fingers 29 from the transmission line jacket.

In another embodiment, the transmission line retention section 102 includes areas of resistance 25 for retaining the transmission line and accommodating a large range of transmission line diameters. FIGS. 10a, 10b, 11a, and 11b illustrate two embodiments of the areas of resistance 25, as shown in a non-stackable embodiment of the hanger 10. However, it will be appreciated that the areas of resistance 25 can be incorporated into the stackable hangers 10 illustrated in FIGS. 1–9.

Figure 10A:
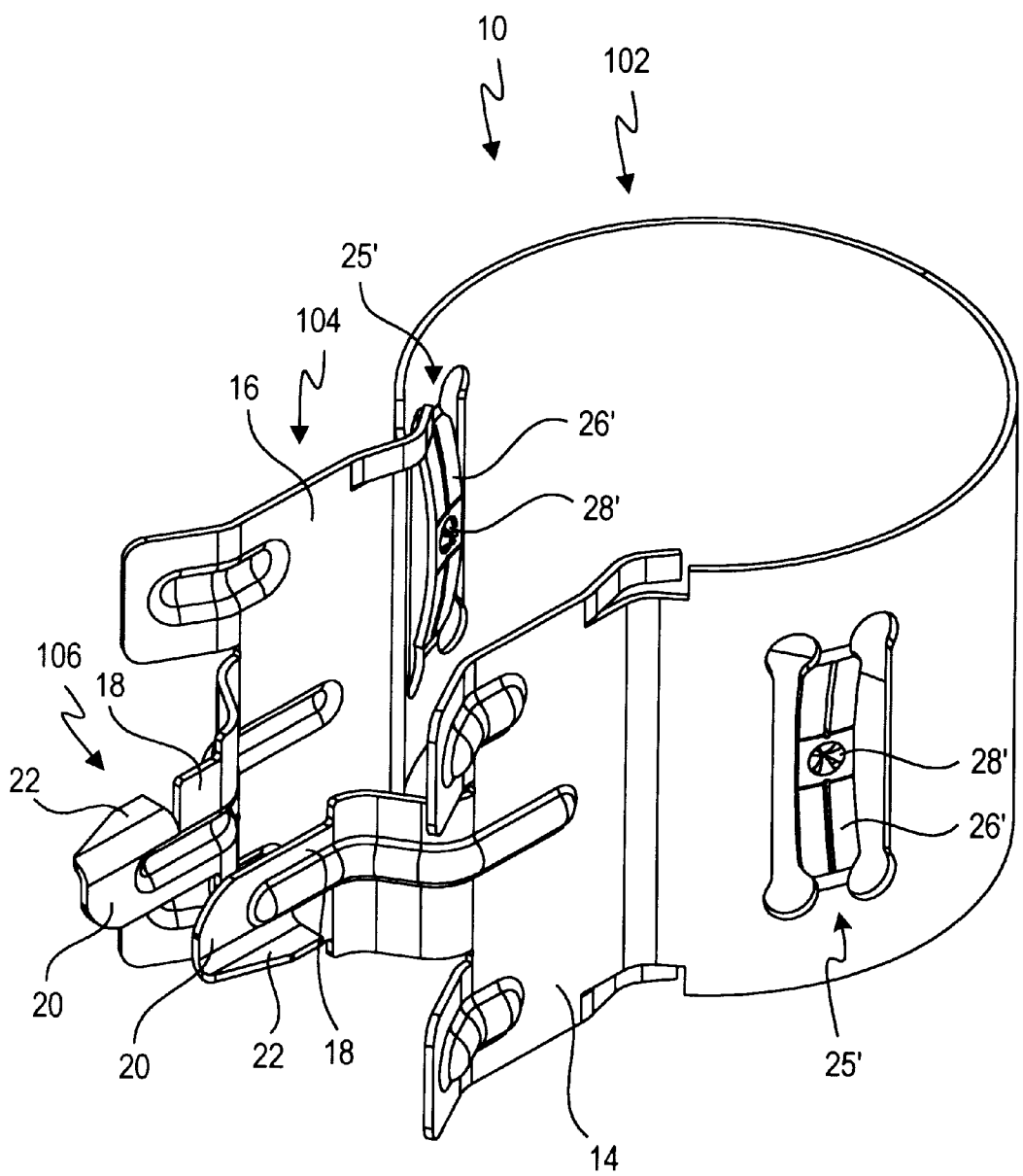
FIG. 10a is a perspective view of a transmission line hanger having areas of resistance.
Figure 10B:
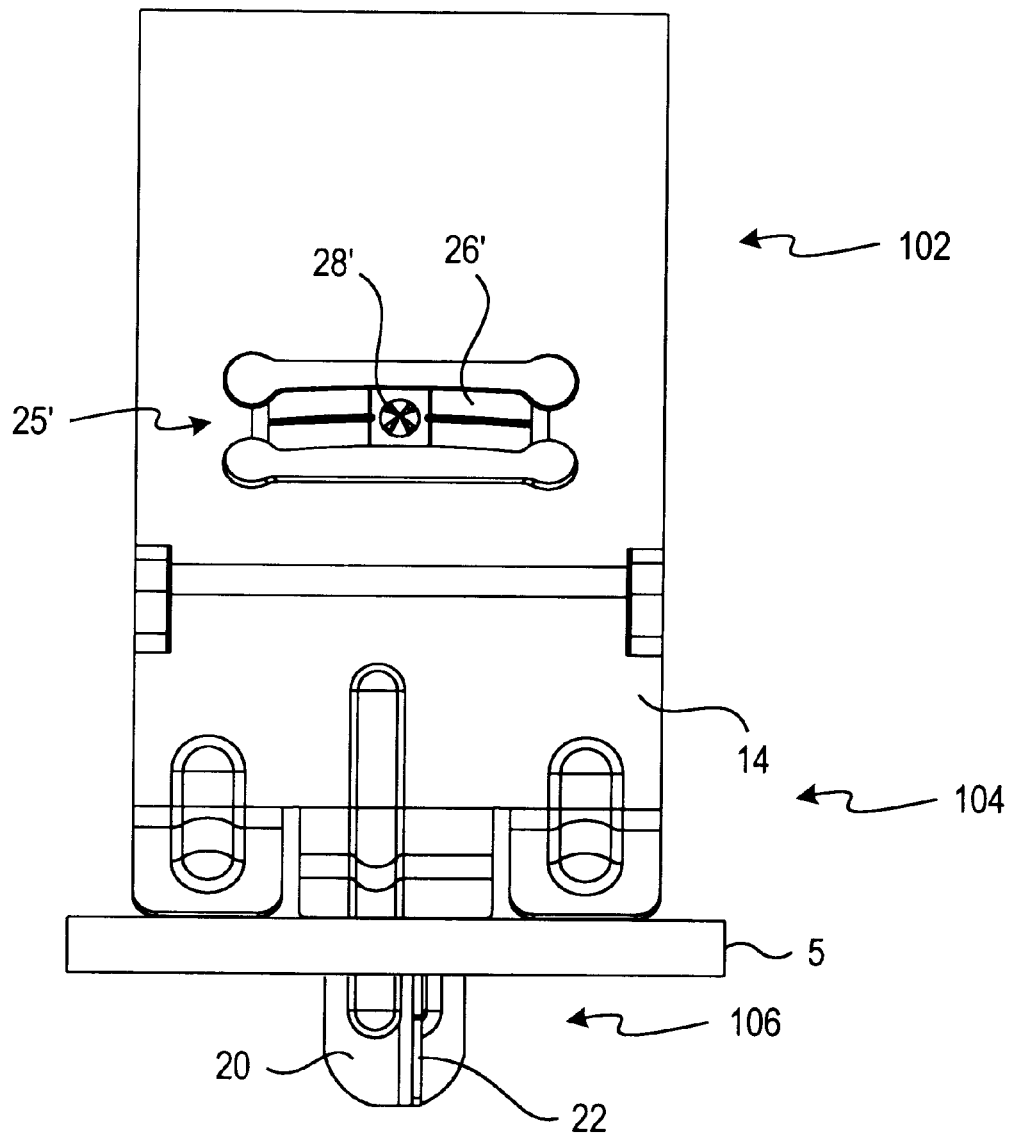

FIGS. 10a and 10b illustrate two opposing areas of resistance 25' that each include an inwardly curved portion 26' and an indentation 28'. The curved portion 26' is attached to the retention section 102 at each end and provides spring resistance against the transmission line after it is inserted in the hanger 10. The indentations 28' help further secure the transmission line within the hanger 10 by penetrating or biting into the jacket of the transmission line. Thus, the indentations 28' minimize the longitudinal movement of the transmission line in the hanger 10 and also help minimize transmission line vibration.

Figure 11A:
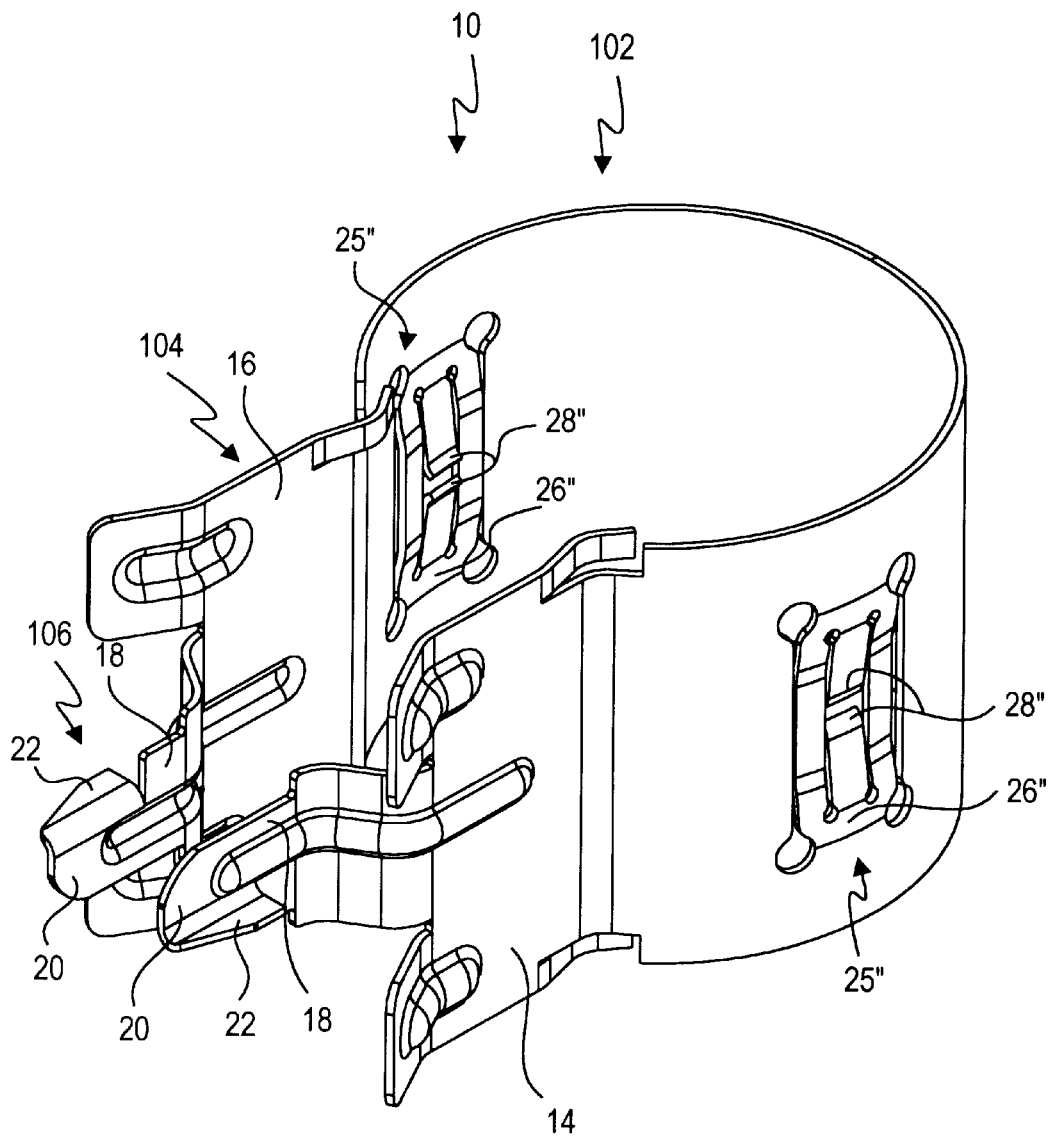
FIG. 11a is a perspective view of a transmission line hanger having areas of resistance.
Figure 11B:
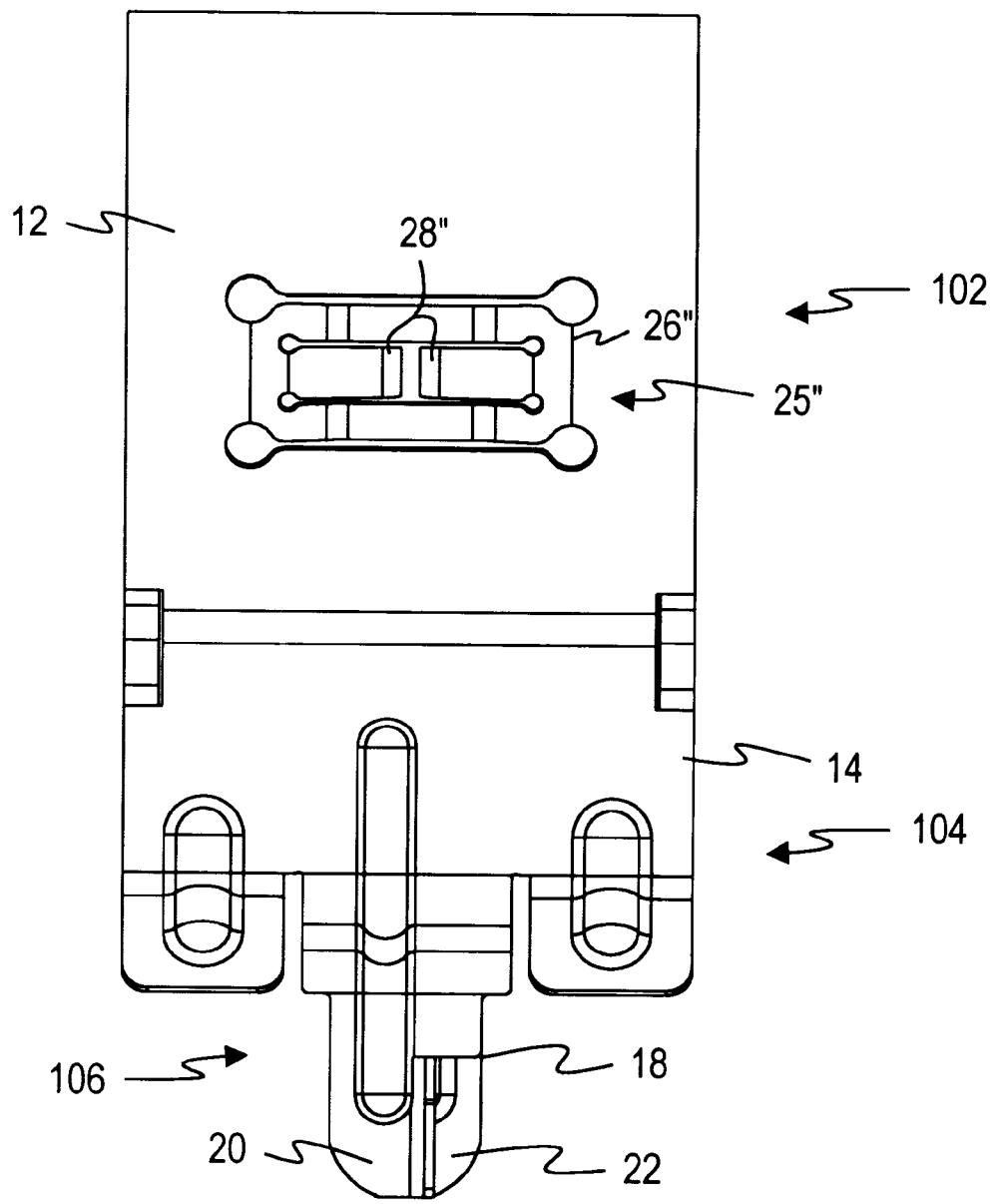

FIGS. 11a and 11b illustrate two opposing areas of resistance 25" that each include an inwardly curved portion 26" and a pair of tabs 28". The curved portion 26" is attached to the retention section 102 at each end and provides spring resistance against the transmission line after it is inserted in the hanger 10. The inwardly bent tabs 28" help further secure the transmission line within the hanger 10 by penetrating or biting into the jacket of the transmission line. Thus, the tabs 28" minimizes the longitudinal movement of the transmission line in the hanger 10 and also help minimize transmission line vibration.

Having two opposing areas of resistance makes the orientation of the transmission line inserted into the hanger 10 irrelevant. No matter how the transmission line is disposed in the hanger 10 (e.g., the areas of resistance are in-between the corrugations of a corrugated cable or are in contact with one of the protruding corrugations), the two opposing areas of resistance 25 will provide spring resistance against the transmission line and the indentation 28' or tabs 28" will penetrate into the jacket of the transmission line.

The present invention provides a one piece, stackable transmission line hanger that is inexpensive to produce. For example, the typical cost of a traditional hanger capable of holding three transmission lines is about three times greater than the cost for three ⅞" diameter stackable hangers 10 (this estimate depends on the style and the amount of hardware required for the traditional hanger). Moreover, the additional hangers 10 do not need to be bought until the additional transmission line runs are added. Thus, the extra cost for the additional hangers 10 can be deferred until the additional transmission line runs are actually installed.

Therefore, the present invention provides a stackable transmission line hanger capable of securing one or more transmission lines to an attachment surface. The stackable hanger is expandable to accommodate addition transmission lines without unassembling the prior hanger(s), is expandable to accommodate a large number of transmission line diameters, is inexpensive to produce, and is quickly and easily installed. In addition, the stackable hanger reduces the number of components required to secure one or more transmission lines, reduces installation time, reduces longitudinal movement of the transmission line within each hanger, and allows for simple installation of additional transmission lines.

Other aspects, features, advantages and modifications of the present invention will become apparent to those skilled in the art upon studying this invention. All such aspects, features, advantages and modifications of the present invention are intended to be within the scope of the present invention as defined by the appended claims.

What is claimed is:

1. One or more stackable transmission line hangers, first and second ones of the hangers being configured to secure first and second transmission lines, respectively, to a supporting structure, each hanger comprising:

a transmission line retention section for accommodating a transmission line, the transmission line retention section including a first leg and a second leg extending therefrom, the first and second legs having a compliant area, thus allowing the hanger to accommodate various sizes of transmission lines, the first and second legs each including a locking barb configured to lock against an attachment surface; and a mounting section extending from the transmission line retention section, the mounting section including a mounting hole disposed therein.

2. The transmission line hanger of claim 1, the locking barb being configured to lock against the attachment surface once the locking barb is inserted through an aperture of the attachment surface.

3. The transmission line hanger of claim 1, the locking barb being configured to lock against the supporting structure once the locking barb is inserted through an aperture of the supporting structure.

4. The transmission line hanger of claim 1, wherein the locking barb being configured to lock against the mounting section once the locking barb is inserted through the mounting hole.

5. The transmission line hanger of claim 1, wherein the mounting hole is defined by a wall having a lip, the locking barb including a notch that is configured to lock against the lip once the locking barb is inserted through the mounting hole.

6. The transmission line hanger of claim 1, wherein the mounting hole is square.

7. The transmission line hanger of claim 1, wherein the compliant area is disposed between the retention section and the mounting section and allows the first and second legs to be compressed toward each other and to expand away from each other by spring force.

8. The transmission line hanger of claim 7, wherein expansion of the first and second legs away from each other brings the first and second legs into contact with a wall that defines an aperture of the attachment surface once the locking barb is inserted through the aperture.

9. The transmission line hanger of claim 1, wherein the first and second legs include respective first and second spring fingers flexibly connected to and projecting inwardly from the respective first and second legs, the first and second spring fingers being configured to retain the transmission line.

10. The transmission line hanger of claim 9, wherein each spring finger penetrates into a jacket of the transmission line to minimize longitudinal movement of the transmission line with respect to the hanger.

11. The transmission line hanger of claim 1, wherein the retention section includes opposing first and second areas of resistance.

12. The transmission line hanger of claim 1, wherein the transmission line hanger is a unitary structure.

13. The transmission line hanger of claim 1, wherein the transmission line hanger is comprised of metal.

14. The transmission line hanger of claim 1, wherein the retention section includes a pair of opposing transmission line stops connected thereto and projecting inwardly therefrom for inhibiting the transmission line from moving into the mounting section.

15. A method for securing one or more transmission lines to a supporting structure comprising:

providing one or more stackable transmission line hangers each including a transmission line retention section for accommodating a transmission line, the transmission line retention section including a first leg and a second leg extending therefrom, the first and second legs having a compliant area, thus allowing the hanger to accommodate various sizes of transmission lines, the first and second legs each including a locking barb configured to lock against an attachment surface having an aperture disposed therein, and a mounting section extending from the transmission line retention section, the mounting section including a mounting hole disposed therein;

placing the retention section around the transmission line;

inserting the locking barb through the aperture; and locking the locking barb against the attachment surface.

16. The method of claim 15, wherein the step of locking the locking barb includes locking the locking barb against the supporting surface.

17. The method of claim 15, wherein the step of inserting the locking barb comprises inserting the locking barb through the mounting hole of another of the hangers and the step of locking the locking barb includes locking the locking barb against the mounting surface of another hanger.

18. The method of claim 15, the locking barb of another hanger including a notch, further including locking a notch of the locking barb of another hanger against a lip of a wall defining the mounting hole once the locking barb is inserted through the mounting hole.

19. The method of claim 15, further including pressing the first and second legs toward each other to enable the locking barb to fit through the aperture.

20. The method of claim 19, further including releasing the first and second legs such that they expand away from each other and bring the first and second legs into contact with a wall defining the aperture once the locking barb is inserted through the aperture.

21. The method of claim 15, further including penetrating spring fingers of the first and second legs, respectively, into a jacket of the transmission line to minimize longitudinal movement of the transmission line with respect to the hanger.

22. A transmission line hanger for securing a transmission line to an attachment surface, the transmission line hanger comprising:

an attachment section for securing the hanger to the attachment surface;

an extended section extending from the attachment section, the extended section allowing the hanger to accommodate a plurality of different transmission line diameters, the extended section including a spring finger flexibly connected thereto and projecting inwardly therefrom, the spring finger being configured to penetrate into a protective jacket around the transmission line once the transmission line is inserted into the hanger, the spring finger minimizing longitudinal movement of the transmission line with respect to the hanger;

a transmission line retention section for retaining the transmission line; and a mounting section extending from the retention section, the mounting section including a mounting hole disposed therein.

23. The transmission line hanger of claim 22, wherein the attachment section includes a locking barb configured to lock against the attachment surface once the locking barb is inserted through an aperture of the attachment surface.

24. The transmission line hanger of claim 23, wherein the locking barb includes a barb contact point for contacting one point on the attachment surface.

25. The transmission line hanger of claim 23, the locking barb being configured to lock against the supporting structure once the locking barb is inserted through an aperture of the supporting structure.

26. The transmission line hanger of claim 23, wherein the mounting hole is defined by a wall having a lip, the locking barb of another hanger including a notch that is configured to lock against the lip once the locking barb is inserted through the mounting hole.

27. The transmission line hanger of claim 22, wherein the mounting hole is square.

28. The transmission line hanger of claim 22, further including a compliant area disposed between the retention section and the mounting section, wherein the attachment section includes first and second legs, the compliant area allowing the first and second legs to be compressed toward each other and to expand away from each other by spring force.

29. The transmission line hanger of claim 22, wherein the retention section includes a pair of opposing transmission line stops connected thereto and projecting inwardly therefrom for inhibiting the transmission line from moving into the mounting section.

30. The transmission line hanger of claim 23, the locking barb being configured to lock against the mounting section of the first hanger once the locking barb is inserted through the mounting hole of the first hanger.

31. A method for securing one or more transmission lines to a supporting structure comprising:

providing first and second stackable transmission line hangers each including a transmission line retention section for accommodating a transmission line, the transmission line retention section including a first leg and a second leg extending therefrom, the first and second legs having a compliant area, thus allowing the hanger to accommodate various sizes of transmission lines, the first and second legs each including a locking barb configured to lock against an attachment surface having an aperture disposed therein, and a mounting section extending from the transmission line retention section, the mounting section including a mounting hole disposed therein, the mounting hole;

placing the retention section of the first hanger around a first transmission line;

inserting the locking barb of the first hanger through the aperture;

placing the retention section of the second hanger around a second transmission line; and locking the locking barb of the second hanger against the mounting section of the first hanger once the locking barb is inserted through the mounting hole of the first hanger.

32. A transmission line hanger assembly including first and second stackable hangers that are configured to secure first and second transmission lines, respectively, to a supporting structure, each hanger comprising:

a transmission line retention section for accommodating a transmission line, the transmission line retention section including a first leg and a second leg extending therefrom, the first and second legs having a compliant area, thus allowing the hanger to accommodate various sizes of transmission lines, the first and second legs each including a locking barb configured to lock against an attachment surface;

a mounting section extending from the transmission line retention section, the mounting section including a mounting hole disposed therein;

the locking barb of the first hanger being configured to lock against the attachment surface;

the locking barb of the second hanger being configured to lock against the mounting section of the first hanger once the locking barb of the second hanger is inserted through the mounting hole of the first hanger.

33. One or more stackable transmission line hangers, first and second ones of the hangers being configured to secure first and second transmission lines, respectively, to a supporting structure, each hanger comprising:

a transmission line retention section for accommodating a transmission line, the transmission line retention section including a first leg and a second leg extending therefrom, the first and second legs allowing the hanger to accommodate various sizes of transmission lines, the first and second legs each including a locking barb configured to lock against an attachment surface; and a mounting section extending from the transmission line retention section, the mounting section including a mounting hole disposed therein;

wherein the locking barb is configured to lock against the mounting section of the first hanger once the locking barb is inserted through the mounting hole of the mounting section of the first hanger.

34. One or more stackable transmission line hangers, first and second ones of the hangers being configured to secure first and second transmission lines, respectively, to a supporting structure, each hanger comprising:

a transmission line retention section for accommodating a transmission line, the transmission line retention section including a first leg and a second leg extending therefrom, the first and second legs allowing the hanger to accommodate various sizes of transmission lines, the first and second legs each including a locking barb configured to lock against an attachment surface; and a mounting section extending from the transmission line retention section, the mounting section including a mounting hole disposed therein, wherein the mounting hole is defined by a wall having a lip, the locking barb including a notch that is configured to lock against the lip once the locking barb is inserted through the mounting hole.

35. One or more stackable transmission line hangers, first and second ones of the hangers being configured to secure first and second transmission lines, respectively, to a supporting structure, each hanger comprising:

a transmission line retention section for accommodating a transmission line, the transmission line retention section including a first leg and a second leg extending therefrom, the first and second legs allowing the hanger to accommodate various sizes of transmission lines, the first and second legs each including a locking barb configured to lock against an attachment surface, wherein the first and second legs include respective first and second spring fingers flexibly connected to and projecting inwardly from the respective first and second legs, the first and second spring fingers being configured to retain the transmission line; and a mounting section extending from the transmission line retention section, the mounting section including a mounting hole disposed therein.

36. One or more stackable transmission line hangers, first and second ones of the hangers being configured to secure first and second transmission lines, respectively, to a supporting structure, each hanger comprising:

a transmission line retention section for accommodating a transmission line, the transmission line retention section including a first leg and a second leg extending therefrom, the first and second legs allowing the hanger to accommodate various sizes of transmission lines, the first and second legs each including a locking barb configured to lock against an attachment surface, wherein the retention section includes a pair of opposing transmission line stops connected thereto and projecting inwardly therefrom for inhibiting the transmission line from moving into the mounting section; and a mounting section extending from the transmission line retention section, the mounting section including a mounting hole disposed therein.

37. A method for securing one or more transmission lines to a supporting structure comprising:

providing one or more stackable transmission line hangers each including a transmission line retention section for accommodating a transmission line, the transmission line retention section including a first leg and a second leg extending therefrom, the first and second legs having a compliant area, thus allowing the hanger to accommodate various sizes of transmission lines, the first and second legs each including a locking barb configured to lock against an attachment surface having an aperture disposed therein, and a mounting section extending from the transmission line retention section, the mounting section including a mounting hole disposed therein;

placing the retention section around the transmission line;

penetrating first and second spring fingers of the first and second legs, respectively, into a jacket of the transmission line to minimize longitudinal movement of the transmission line with respect to the hanger, wherein the first and second spring fingers are flexibly connected to and projecting inwardly from the respective first and second legs;

inserting the locking barb through the aperture; and locking the locking barb against the attachment surface.

38. A method for securing one or more transmission lines to a supporting structure comprising:

providing one or more stackable transmission line hangers each including a transmission line retention section for accommodating a transmission line, the transmission line retention section including a first leg and a second leg extending therefrom, the first and second legs having a compliant area, thus allowing the hanger to accommodate various sizes of transmission lines, the first and second legs each including a locking barb configured to lock against an attachment surface having an aperture disposed therein, and a mounting section extending from the transmission line retention section, the mounting section including a mounting hole disposed therein;

placing the retention section around the transmission line;

pressing the first and second legs toward each other to enable the locking barb to fit through the aperture;

inserting the locking barb through the aperture; and locking the locking barb against the attachment surface.

* * * * *